UNITED STATES PATENT OFFICE.

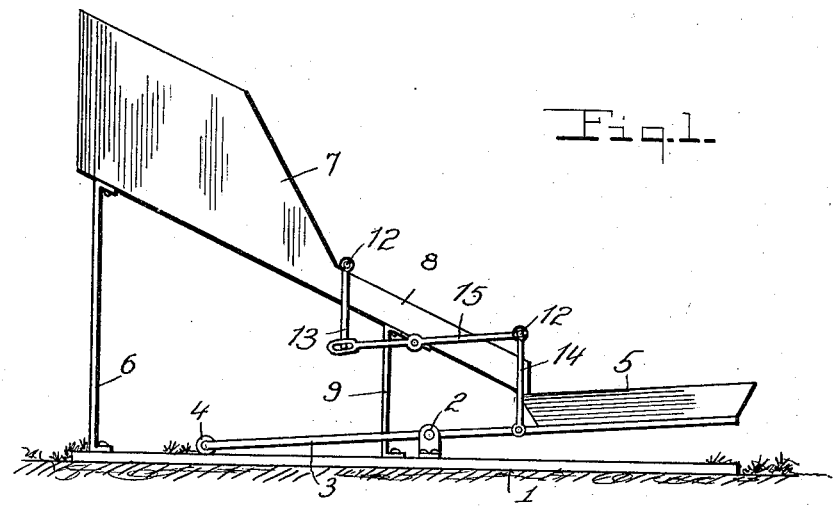
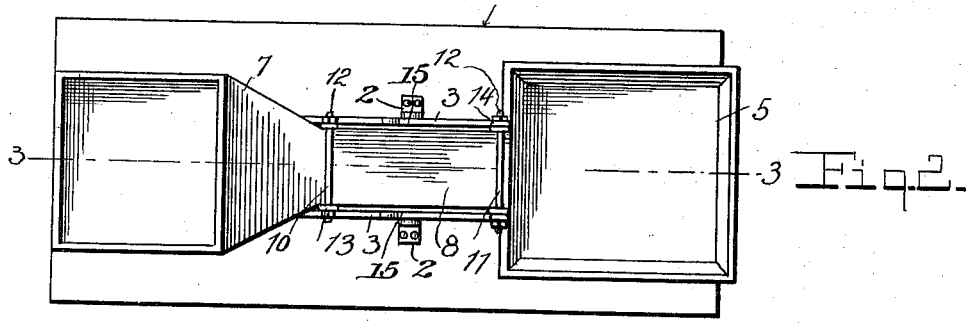
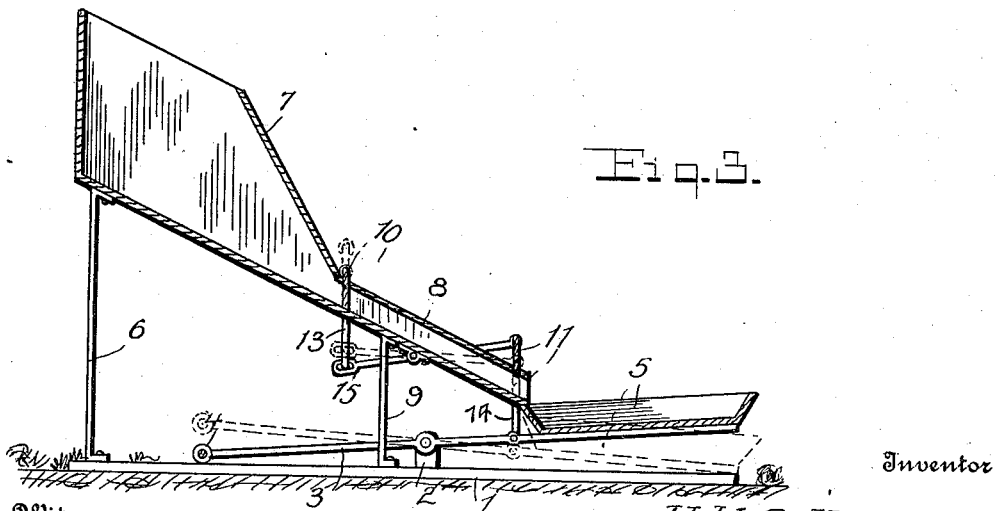

HARLEY W. CALLAHAN, OF ROUNDUP, MONTANA, ASSIGNOR OF ONE-THIRD TO BRIT STEEN, OF ROUNDUP, MONTANA.

FEED-BOX.

1,072,570.         Specification of Letters Patent.     Patented Sept. 9, 1913.

Application filed November 27, 1912. Serial No. 733,863.

*To all whom it may concern:*

Be it known that I, HARLEY W. CALLAHAN, a citizen of the United States, residing at Roundup, in the county of Musselshell and State of Montana, have invented certain new and useful Improvements in Feed-Boxes, of which the following is a specification, reference being had to the accompanying drawings.

This invention relates to new and useful improvements in feeding devices and more particularly to a feed box for horses and my object is to provide a device of this character in which a limited amount of grain or other food will be permitted to enter the feed box.

A further object of the invention resides in providing a hopper or reservoir for the grain which is adapted to have communication with the feed box proper and a still further object resides in providing means for automatically controlling the passage of the grain from the hopper to the feed box.

A still further object of the invention resides in providing a device which is extremely simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claim.

In the accompanying drawing forming a part of this application, Figure 1 is a side elevation of the device. Fig. 2 is a plan view thereof. Fig. 3 is a vertical longitudinal section therethrough as seen on line 3—3, Fig. 2.

In describing my invention, I shall refer to the drawing in which similar reference characters designate corresponding parts throughout the several views and in which—

1 indicates a base or platform, and mounted thereon and extending transversely of the same, intermediate of its ends, are the supporting brackets 2, upon which are pivotally mounted a pair of longitudinal arms 3. Mounted on one end of these arms and connecting the same, is a weighted member 4, while a feed box or trough 5 is mounted on the opposite ends thereof. From this construction, it will be seen that the arms with the weighted member and feed box at the opposite end thereof are adapted to oscillate on the supporting brackets 2, the normal position of the same being such as to dispose the feed box or trough slightly above the base 1.

Mounted on the supporting members 6, extending upwardly from one end of the base 1, is a grain or feed hopper 7 and leading therefrom is a spout or the like 8, which is supported by additional braces 9 and leads to a point over the feed box or trough 5, so that the contents of the hopper may be readily passed to the latter. I have, however, provided a means to regulate the flow of the grain from the hopper 7 to the box or trough 5 and to this end, I provide a pair of vertically operating valves 10 and 11, the former being disposed at the junction of the hopper 7 and the spout 8, and the latter in the spout adjacent the free end thereof. These valves 10 and 11, which are in themselves plates or the like, have the laterally extending arms 12 formed thereon, to which are pivotally connected, respectively, the depending arms 13 and 14, the latter arms being pivotally connected at their opposite ends to the arms 3 on the one side thereof adjacent the trough or box 5. A pair of additional arms 15 are centrally pivoted on opposite sides of the spout 8 and have one of their ends pivotally engaged with the laterally extending arms 12 of the lower valve 11 and the opposite ends of the same are similarly engaged with the lower ends of the depending arms 13.

From the above construction, it will be seen that in the normal position of the device, that is, the position which disposes the feed box or trough 5 slightly above the base, the valve 10 will be closed and the valve 11 open and as the trough or box 5 is forced downwardly, the position of the valves will be reversed to allow the grain from the hopper to flow to the spout 8. Upon the return of the box or trough 5 to its initial position, the valve 10 will again be closed and the valve 11 open, whereby the grain in the spout between said valves will be allowed to flow to the feed box. It will be understood, therefore, that but a limited amount of grain or feed will be allowed to flow from the hopper to the box proper, so that the animals feeding therefrom will commit no waste. Each time an animal's mouth is placed in the feed box, it will be understood that the same is forced downwardly, which will allow a certain amount of the feed in the hopper to pass to the spout, whereupon on the removal of the animal's mouth therefrom, this grain or other feed will flow to the feed box.

From the foregoing it will be seen that I have provided a simple, inexpensive and efficient means for carrying out the objects of the invention, and while I have particularly described the elements best adapted to perform the functions set forth, it is obvious that various changes in form, proportion and in the minor details of construction may be resorted to without departing from the spirit or sacrificing any of the principles of the invention.

Having thus described this invention, what I claim is:—

In a feed box, the combination with a base, of a hopper mounted thereon, a spout extending from the hopper, valves disposed at the ends of the spout and vertically movable therein, links depending from the valves, a tilting frame, a trough secured to said frame and normally engaging the lower side of the spout, a weight secured to one end of the frame for forcing the trough into engagement with the spout, links extending from the valves, certain of said links being connected to the frame, and rocker arms pivotally connecting certain of the links.

In testimony whereof I hereunto affix my signature in the presence of two witnesses.

HARLEY W. CALLAHAN.

Witnesses:
H. S. SIMPSON,
J. W. WILLIAMS.

---

Copies of this patent may be obtained for five cents each, by addressing the "Commissioner of Patents, Washington, D. C."